Feb. 27, 1968   P. BELLE   3,370,465
TURBINE-TYPE FLOW METER
Filed May 21, 1965   2 Sheets-Sheet 1

INVENTOR.
Pierre Belle
BY Pennie, Edmonds, Morton,
Taylor and Adams
ATTORNEYS

Feb. 27, 1968   P. BELLE   3,370,465
TURBINE-TYPE FLOW METER
Filed May 21, 1965   2 Sheets-Sheet 2

INVENTOR.
Pierre Belle
BY Pennie, Edmonds, Morton,
Taylor and Adams
ATTORNEYS

United States Patent Office 3,370,465
Patented Feb. 27, 1968

3,370,465
TURBINE-TYPE FLOW METER
Pierre Belle, Grenoble, France, assignor to S.A.T.A.M. Societe Anonyme pour tous Appareillages Mecaniques, Paris, and (Sogreah) Societe Grenobloise d'Etudes et d'Applications Hydrauliques, Grenoble, France, both French companies
Filed May 21, 1965, Ser. No. 457,550
Claims priority, application France, May 28, 1964, 976,170
4 Claims. (Cl. 73—230)

ABSTRACT OF THE DISCLOSURE

There is disclosed a flow meter in which a rotor having helical blades is supported to rotate on a stationary shaft disposed axially of a conduit having a cross-section graduated along the length thereof—a conical conduit in particular. Abutments on the shaft define limiting upstream and downstream positions for the rotor between which it can move axially of the conduit on the shaft, the rotor being at least partly within the conical portion of the conduit in at least one of these limiting positions. A helical spring engaged about the shaft between the rotor and the downstream abutment stresses the rotor against its upstream abutment. As a result, for flow rates above a threshold value at which the fluid exerts on the rotor an axial downstream force equal to that exerted on it by the spring, the rotor moves axially downstream to positions of altered clearance between the rotor and conduit and hence of altered relation between the volume of fluid passing through the conduit in unit time and the number of rotations made by the rotor in unit time. Magnetic means are provided to count the rotations of the rotor. There is also disclosed an elastic deflector disposed in the conduit immediately upstream of the rotor.

---

This invention relates to turbine-type liquid flow meters of the kind in which a turbine rotor having helical blades is mounted in a bore and is rotated by the flow of liquid through the bore axially of the rotor.

The accuracy of such meters depends on the constancy of the number of revolutions made by the turbine per unit of volume of the liquid flowing through the bore, and it is desirable that variations in this ratio shall be within the permissible tolerance limits for as wide a range of rates of liquid flow as possible.

It is known to calibrate weight or volume meters of this type by varying the clearance between the axial turbine rotor and a conical bore by adjusting the relative positions of the turbine rotor and the bore so as to vary the rotation rate of the rotor per unit flow. This regulating method, in which the relative position of rotor and bore is fixed during operation, does not however permit of increasing the precision of meters in the region of low flow rates.

According to the present invention, in a turbine liquid flow meter of the kind referred to, the rate of rotation of the turbine rotor per unit volume of flow is modified automatically in dependence upon the flow rate to be measured in such a manner that the variations in the rate of rotation remain within acceptable limits. The modification of the rate of rotation is effected by longitudinal displacement of the turbine rotor under the dynamic influence of the flow of liquid against the resistance of an elastic compensation arrangement, the turbine being so constructed that such axial displacement automatically and progressively varies the clearance between the turbine rotor and the bore in which it rotates.

The invention is hereinafter described in detail with reference to the accompanying drawings which show examples of turbine meters according to the invention and in which.

If the characteristic curve of a turbine-type liquid flow meter having helical rotor blades is drawn by plotting as abscissae the flow rate to be measured and as ordinates the corresponding values of the rotation rate, i.e. the ratio given by the number of revolutions executed by the rotor for unit volume of liquid flowing past it, it is found that in the case of a conventional meter, as the flow rate rises from zero the ratio first increases and then decreases, to become stabilized in the vicinity of a theoretical straight line parallel to the axis of abscissae representing a rotation rate which is invariable in the flow rate.

Figure 2:
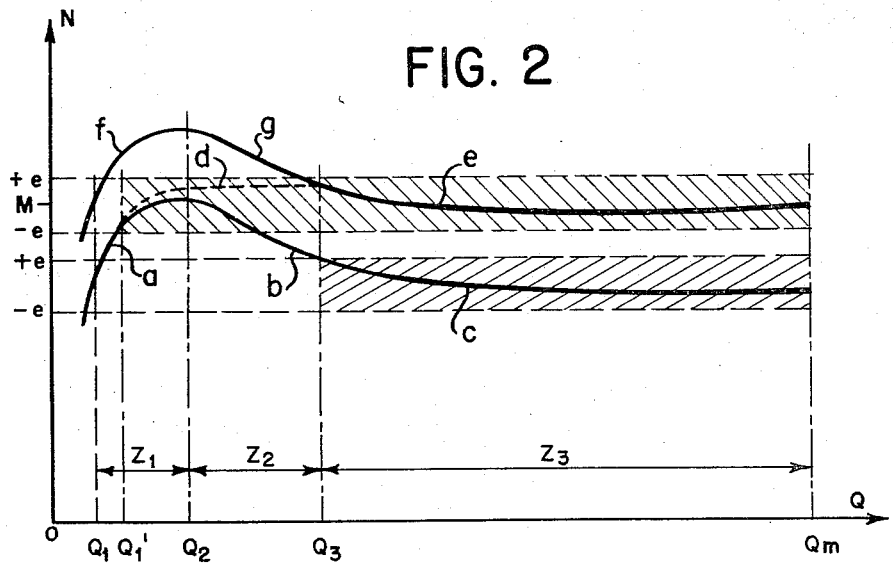
FIGURE 2 shows the characteristic curve of the meter of FIGURE 1, and, for comparison therewith, the curve of a similar meter not provided with automatic means for change in the rotor rotation rate in accordance with the invention.

Such a curve is shown as the lower curve in FIGURE 2, wherein it is designated as $abc$, and it will be seen that the rotation rate remains within the tolerances $+e$ and $-e$ from a constant value M only for flow rates $Q_3$ or larger, and that it is hence not usable for lower rates of flow if these tolerances apply.

In the case of meters having turbines of the type known as short blade rotor turbines, the rotation rate, which is very small for small rates of flow, increases rapidly to stabilize eventually at a substantially constant value.

Figure 4:
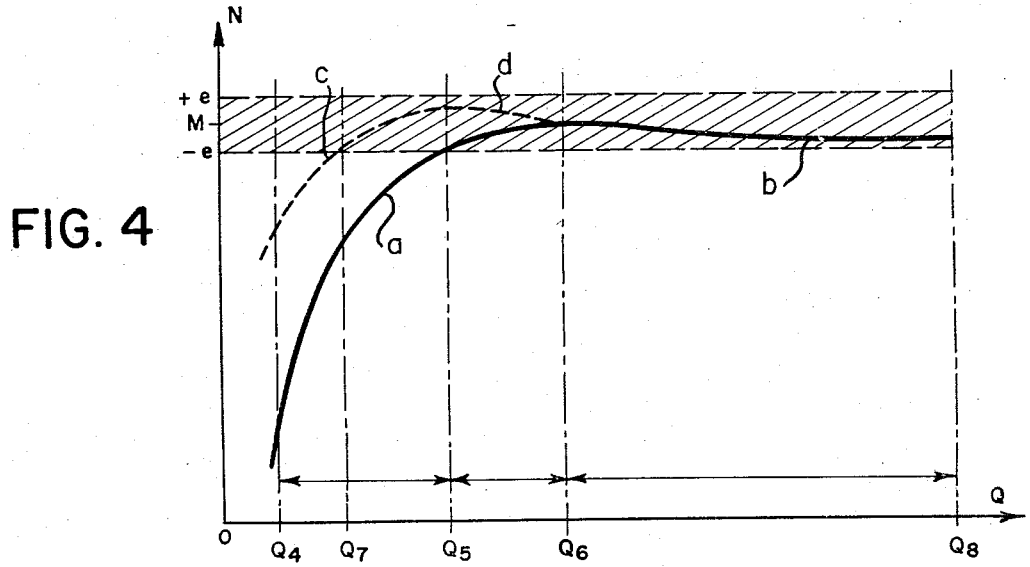
FIGURE 4 shows curves similar to those of FIGURE 2, but pertaining to the embodiment of FIGURE 3.

The characteristic curve of such a type of meter is shown in FIGURE 4 by the curve $ab$ and it will be seen that the rotation rate remains within the tolerances $+e$ and $-e$ from a constant value M only for flow rates greater than $Q_5$.

Applicants have found that if the axial turbine rotor of a meter is arranged in a conical bore in such a manner that it can be displaced along the axis of the bore, and if this displacement is made responsive to the liquid flow rate acting on the rotor, a succession of modifications are imposed on the value of the rate of rotation of the turbine rotor in dependence on the flow rate in such a manner that the characteristic curve of the turbine is corrected.

In accordance with one embodiment of the invention, for rotors of the type whose characteristic curve is the curve $abc$ of FIGURE 2, the clearance between bore and rotor is reduced, as the rate of flow increases, down to a lower limit for the clearance. This has the effect of increasing the rotation rate of the rotor in the range of flow rates where this variation of the bore-rotor clearance is produced.

In accordance with another embodiment of the invention, for rotors of the type whose characteristic curve is the curve $ab$ of FIGURE 4, the bore-rotor clearance is increased as the rate of flow increases, up to a maximum value for the clearance. This has the effect of reducing the rate of rotation of the rotor in the range of flow rates where this variation of the bore-rotor clearance is produced.

Figure 1:
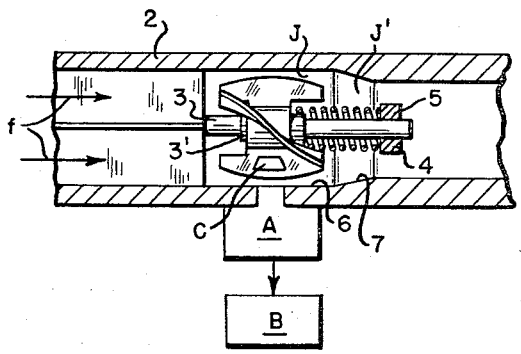
FIGURE 1 is a diagrammatic view in axial section of a turbine liquid flow meter according to the present invention.

Referring to FIGURES 1 and 2, it will be seen that the flow meter comprises by a bladed rotor 1 turning in a conduit 2, the flow rate in which is to be accurately measured, the liquid flowing in the direction indicated by the arrows $f$.

This rotor 1 is axially displaceable on its shaft 3, under influence of the flowing liquid, against the stress of an opposing spring 4 dimensioned in accordance with the pressure drops in the helical blading. The spring bears against an end-of-travel abutment 5 in such a manner that the rotor can be displaced axially along its axis under the effect of the flow when the flow rate exceeds a predetermined threshold minimum value.

The bore of the conduit is cylindrical at 6 with a clearance J between the bore and the rotor, but according to the invention the bore is made conical at 7 downstream of the rest position of the rotor which the rotor occupies for flow rates below the threshold, this rest position being defined by a collar 3' on shaft 3 upstream of the rotor. The conical section of the bore converges towards the downstream side with a clearance J' between the bore and the rotor when the latter is in the position of maximum displacement from its rest position.

The characteristic curves of FIGURE 2 relating to the turbine meter of FIGURE 1 have been established in the usual manner by plotting as ordinates the rate of rotation N of the rotor (in revolutions per liter) and as abscissae the flow rate Q (in liters per minute).

The lower curve $abc$ represents the characteristic of a conventional turbine meter having an axially fixed rotor with clearance J between bore and rotor in the cylindrical portion 6 of the bore shown in FIGURE 1. The curve $fge$ represents the characteristic of a conventional turbine meter having an axially fixed rotor with a clearance J' (less than J) between bore and rotor. The curve $ade$ represents the corrected characteristic curve according to the invention, with the axially movable rotor and variable bore of FIGURE 1.

If the rotor of the meter of FIGURE 1 were conventionally arranged in the bore 6 with the clearance J and without possibility of axial displacement, the conventional characteristic curve $abc$ of FIGURE 2 would be obtained, and it will be seen that only flow rates greater than a value $Q_3$, represented by the portion $c$ of the curve situated in the zone $Z_3$ of flow rates, would be measured with an acceptable precision within the permissible error limit of $+e$ and $-e$.

With the rotor 1 of FIGURE 1 which is axially displaceable according to the invention against an opposing spring 4, there is obtained at first for small rates of flow from $Q_1$ to $Q_1'$ the same portion of curve $a$ as in the preceding case, since the rotor is not displaced axially from its rest position and remains within the cylindrical bore with a clearance J, the axial pressure on the rotor due to this small flow being insufficient to overcome the resistance of the spring.

On the other hand, as the rate of flow increases, it reaches a value $Q_1'$ at and beyond which the forces due to the flow are sufficient to displace the rotor progressively downstream into the conical section 7, compressing the spring 4 and thus progressively diminishing the radial clearance between the rotor and its bore to reach the value J', and giving rise to a progressive increase in the rotation rate of the rotor, correcting the portion $b$ of the curve between $Q_2'$ and $Q_3$ to transform it into a curve portion $d$ comprised in the region of flow rates between $Q_1'$ and $Q_3$.

The maximum axial displacement of the rotor, limited by the compression force of the spring 4 which bears on the abutment 5, is reached for a predetermined flow rate $Q_3$ from which onwards the rotation rate of the rotor remains substantially constant, represented by the curve portion $e$ in the region $Z_3$ of flow rates.

There is thus obtained a modified curve $ade$ giving measurements comprised within the permissible limits of error $-e$ $+e$ for a range of flow rates from $Q_1'$ to $Q_M$ which is considerably greater than the flow rate range $Q_3$ to $Q_M$ obtained with the conventional curve $abc$.

Figure 3:
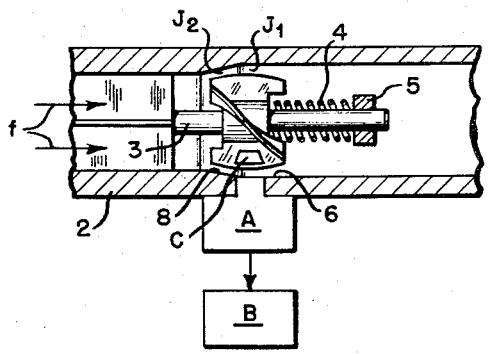
FIGURE 3 is a diagrammatic view in axial section of another turbine-type liquid flow meter according to the invention.

It is possible to correct an initial characteristic of the type shown by the curve $ab$ in FIGURE 4 for a short-bladed rotor (such as is shown in FIGURE 3) and which is axially immovable by means of a displaceable rotor arrangement such as is shown in FIGURE 3, the conical bore 8 being arranged upstream of the rotor and being divergent in the downstream direction.

The curve $a$ of FIGURE 4 between flow rates $Q_4$ and $Q_6$ represents the initial characteristic of a turbine having a short-blade rotor which is not displaceable and which has a clearance $J_1$ (FIGURE 3) between a cylindrical bore and rotor.

Correction in this case produces the curve $cd$ of FIGURE 4 in the region $Q_4$ to $Q_6$. That is to say, commencing at the value $Q_4$, there is an increase in the rotation rate of the rotor corresponding to the position of the rotor before its axial displacement, with a clearance $J_2$ in the cone 8 less than the clearance $J_1$.

It will be seen from this corrective curve $cd$, which reaches a maximum at the flow rate $Q_5$, that the rotor of FIGURE 3 begins to be displaced downstream under the action of the flow at the flow rate $Q_5$, so that its rate of rotation diminishes progressively in the zone of flow rates from $Q_5$ to $Q_6$ which gives rise to the curve portion $d$, to reach at the position of maximum displacement of the rotor in the downstream direction, from a flow rate $Q_6$ onwards, a substantially constant value of the rotation rate corresponding to the actual clearance $J_1$, i.e. the curve portion $b$ of the initial characteristic in the region of flow rates from $Q_6$ and higher.

Thus there is obtained a modified curve $cdb$ making it possible to carry out measurements with the desired precision for a range of flow rates from $Q_7$ to $Q_8$ which is wider than the range $Q_5$–$Q_8$ corresponding to the initial curve $ab$.

It is also possible to improve characteristic curve of a turbine-type meter, corrected according to the invention, by combining the arrangements of the French patent application No. PV 976,171, filed May 28th, 1964, now French Patent No. 1,451,208 with those of the present invention, that is to say by providing the conduit 2 upstream of the displaceable rotor 1 with an elastic deflector of suitable stiffness and of appropriate orientation in accordance with the portion of the curve which it is proposed to improve and the correction to which it is desired to subject it. Such an embodiment of the invention is shown in FIGURE 5.

Figure 5:
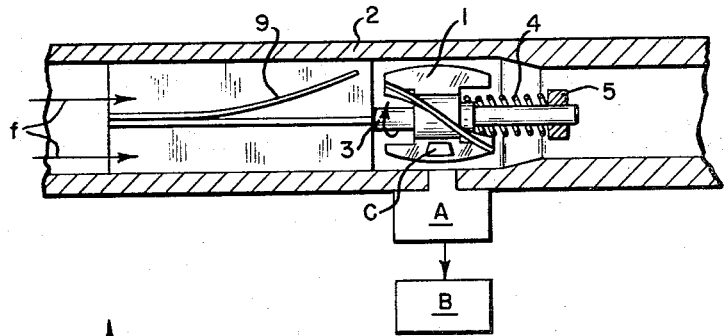
FIGURE 5 shows a diagrammatic view in axial section of a turbine liquid flow meter provided with a dual rotation rate varying means.
Figure 6:
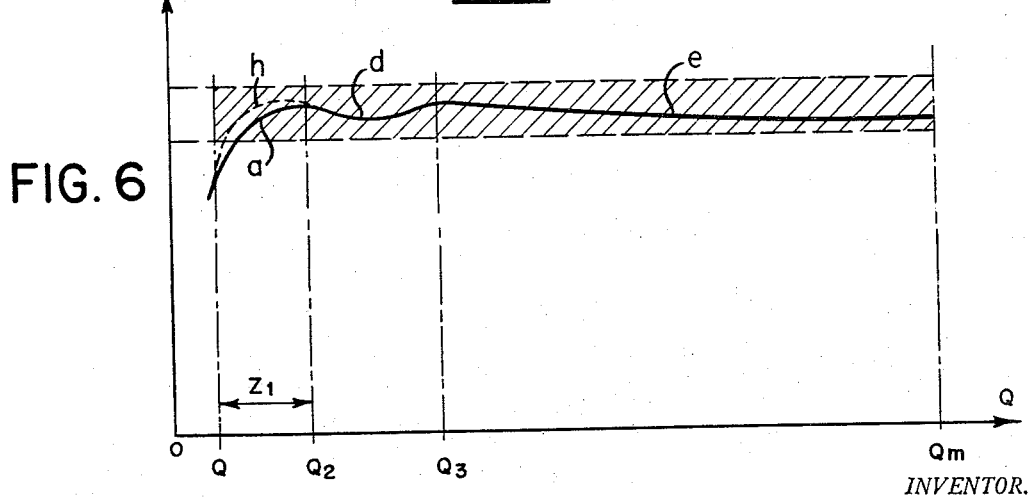
FIGURE 6 shows the characteristic curves of the embodiment of FIGURE 5.

For example, it is possible to improve for very small flow rates the corrected curve $ade$ of FIGURE 2 which is reproduced in FIGURE 6 by providing the duct 2 of FIGURE 5, upstream of the rotor 1 (which is displaceable axially according to the invention), with an elastic deflector 9 which is arranged in such a manner that its angle of incidence is in the direction of rotation of the rotor, this deflector being readily flexible so that it can function at small flow rates and thus increase in the region $Z_1$ of small flow rates (FIGURE 6) the rotation rate of the rotor, correcting the portion $a$ of the characteristic in the upward sense to conform to the dash-line portion $h$ so that the improved characteristic is represented by a new curve $hde$ instead of $ade$, giving precise measurements over an even wider range of flow rates.

In the said application there is disclosed a turbine-type meter in which there are provided upstream of the rotor one or more deflectors each having approximately the shape of a propellor blade anchored at its leading or upstream edge but otherwise free. These deflectors are made of resilient, flexible material such as sheet metal. The sense of their pitch or coiling may be either the same as or opposite to that of the blades of the turbine rotor. At high flow rates the deflectors tend to be brought into parallelism with the length of the conduit by the streaming action of the liquid. If the pitch of the deflectors is opposite to that of the turbine blades, then at low flow rates the deflectors raise the rate of rotation of the turbine per unit volume of flow. If the pitch of these deflectors is of the same sign as that of the turbine blades, the deflectors lower the number of turns made by the turbine for unit volume of flow, again at low flow rates. FIGURE 5 shows a deflector blade 9 thus having the opposite pitch from the turbine blades. It therefore raises the rate of rotation of the turbine at low flow rates, from the curve portion $a$ to the curve portion $h$ between the flow rates Q and $Q_2$ in FIGURE 6.

The meters of the invention may employ any of various known means to permit counting of the revolutions made by the turbine rotor. For example, a piece of ferromagnetic material may be included in one of the rotor blades, and an electrical coil may be placed against the conduit on the exterior thereof adjacent the rotor, the conduit being in this region of its length made of non-magnetic material. On each revolution of the turbine a voltage pulse is then induced in the coil, and these pulses may be counted by suitable well-known apparatus. Thus there is shown in each of FIGS. 1, 3 and 5 a pickup unit A containing a coil in which voltage pulses are induced upon passage of a ferro-magnetic section C in one of the rotor blades. These voltage pulses are delivered to a counter B by means of which the rotations of the rotor can be counted.

While the invention has been described herein in terms of a number of presently preferred exemplary embodiments, the invention itself is not limited thereto but rather comprises all modifications of and departures therefrom falling within the spirit and scope of the appended claims.

I claim:

1. A turbine-type flow meter comprising a conduit having an upstream end and a downstream end and having a portion of graduated cross-section, a rotor having helical vanes, means to support the rotor within said conduit for rotation about its own axis substantially parallel to the length of the conduit and for parallel motion lengthwise of said axis between limiting upstream and downstream positions in at least one of which positions the rotor is at least partly within said portion, resilient means biasing the rotor to said upstream limiting position, and magnetic means fixed with respect to said conduit to count the rotations of said rotor, whereby for rates of flow of fluid through said conduit above a threshold value said rotor will be displaced from its limiting upstream position to positions of changed clearance between said rotor and said conduit.

2. A flow meter according to claim 1 wherein said portion of graduated cross-section increases in cross-section toward the downstream end of said conduit.

3. A flow meter according to claim 1 wherein said portion of graduated cross-section increases in cross-section toward the upstream end of said conduit.

4. A flow meter according to claim 1 further comprising a flow-responsive deflector disposed in the conduit upstream of the rotor.

References Cited

UNITED STATES PATENTS

| | | | |
|---|---|---|---|
| 790,888 | 5/1905 | Ferris. | |
| 2,293,478 | 8/1942 | Stevenson | 73—203 |
| 3,000,210 | 9/1961 | Faure-Herman | 73—231 |
| 3,024,656 | 3/1962 | Faure-Herman | 73—230 |
| 3,164,020 | 1/1965 | Groner et al. | 73—231 |
| 3,169,397 | 2/1965 | Murray | 73—231 |

FOREIGN PATENTS

| | | |
|---|---|---|
| 188,832 | 4/1964 | Sweden. |
| 1,278,190 | 10/1961 | France. |
| 1,288,912 | 2/1962 | France. |

RICHARD C. QUEISSER, *Primary Examiner.*

J. J. GILL, *Examiner.*

E. GILHOOLY, *Assistant Examiner.*

UNITED STATES PATENT OFFICE
CERTIFICATE OF CORRECTION

Patent No. 3,370,465                          February 27, 1968

Pierre Belle

It is certified that error appears in the above identified patent and that said Letters Patent are hereby corrected as shown below:

Column 3, line 67, for "$Q_2'$" read -- $Q_1'$ --.

Signed and sealed this 24th day of June 1969.

(SEAL)
Attest:

Edward M. Fletcher, Jr.

Attesting Officer

WILLIAM E. SCHUYLER, JR.

Commissioner of Patents